United States Patent
Oliphant

(10) Patent No.: US 9,083,937 B1
(45) Date of Patent: Jul. 14, 2015

(54) CAMERAS AND IMAGE PROCESSING METHODS FOR RESPECTING RECORDING RESTRICTIONS

(71) Applicant: GOOGLE INC., Mountain View, CA (US)

(72) Inventor: Daniel Oliphant, Turtle Creek, PA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/815,906

(22) Filed: Mar. 15, 2013

(51) Int. Cl.
H04N 9/80 (2006.01)
H04N 9/79 (2006.01)
G03B 21/06 (2006.01)
G09G 5/00 (2006.01)

(52) U.S. Cl.
CPC ...................................... H04N 9/79 (2013.01)

(58) Field of Classification Search
USPC .............. 386/257, 239, 248; 353/30; 345/629
See application file for complete search history.

(56) References Cited

U.S. PATENT DOCUMENTS

| 6,018,374 | A * | 1/2000 | Wrobleski ..................... 348/744 |
| 6,559,883 | B1 * | 5/2003 | Fancher et al. ................ 348/164 |
| 7,386,125 | B2 * | 6/2008 | Bilobrov et al. .............. 380/201 |
| 7,432,983 | B2 * | 10/2008 | Masukura et al. ............. 348/576 |
| 8,439,503 | B2 * | 5/2013 | Reichow et al. ................ 353/30 |
| 8,696,135 | B2 * | 4/2014 | Yoon et al. ........................ 353/31 |
| 2012/0314085 | A1 | 12/2012 | Gohshi et al. |
| 2012/0320106 | A1 | 12/2012 | Gohshi et al. |

FOREIGN PATENT DOCUMENTS

KR 20050074867 7/2005

* cited by examiner

*Primary Examiner* — Daquan Zhao
(74) *Attorney, Agent, or Firm* — Procopio, Cory, Hargreaves & Savitch LLP

(57) ABSTRACT

Cameras and image processing methods for respecting recording restrictions are described, including a camera with at least one lens, at least one processor, and memory. The camera can detect an external signal; determine that the external signal indicates a restriction in recording; and based on the restriction, either disable recording or record an image or a video with a region of the image obfuscated.

18 Claims, 5 Drawing Sheets

CAMERAS AND IMAGE PROCESSING METHODS FOR RESPECTING RECORDING RESTRICTIONS

BACKGROUND

1. Field of Art

The subject matter discussed herein relates generally to cameras and image processing and, more particularly, to cameras and image processing methods for respecting recording restrictions.

2. Related Background

Conventionally, cameras are devices that are dedicated to performing the camera functions (e.g., capturing still images and videos). The conventional cameras were large and easy to detect. People carried such conventional cameras primarily for special occasions.

Current related art cameras that can take still images and videos are smaller and more integrated with daily life. Cameras are small enough to be embedded in many devices, such as mobile telephones, computers, tablet devices, helmets, eyewear (e.g., eye), and pens, etc.

With the proliferation of cameras, it has become difficult for individuals and businesses to keep something that is private, such as their faces or business secrets, from being recorded. An individual walking down the street may not want his or her face to show up in the background of a video on a video sharing website. On the recording side, the person taking the image or video may not want to record an unwilling individual or restricted object.

SUMMARY

Cameras and image processing methods for respecting recording restrictions are described, including a camera with at least one lens, at least one processor, and memory. The camera can detect an external signal; determine that the external signal indicates a restriction in recording; and based on the restriction, either disable recording or record an image or a video with a region of the image obfuscated.

According to another example implementation, a camera-implemented method for image processing is provided, comprising detecting a recording restriction signal from an external source; determining that the recording restriction signal is a privacy restriction; calculating a restricted region based on the privacy restriction; recording one or more images, at least one of the images having the calculated restricted region obfuscated; and storing the at least one of the images.

According to yet another example implementation, a non-transitory computer readable medium having stored therein computer executable instructions is provided, for detecting a recording restriction signal from an external source; determining that the recording restriction signal is a privacy restriction; calculating a restricted region based on the privacy restriction; recording one or more images, at least one of the images has the calculated restricted region obfuscated; and storing the at least one of the images.

DETAILED DESCRIPTION

The subject matter described herein is taught by way of example implementations. Various details have been omitted for the sake of clarity and to avoid obscuring the subject matter. The examples shown below are directed to structures and functions of cameras and image processing methods for respecting recording restrictions.

Figure 1A:
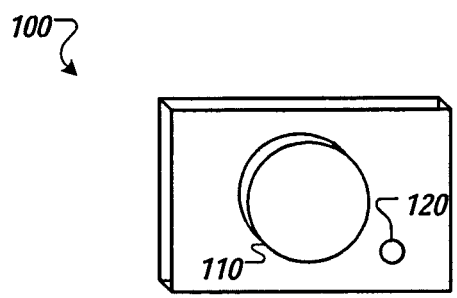
FIG. 1A shows a perspective view of an example camera.

FIG. 1A shows a perspective view of an example camera. Camera 100 includes a lens 110 and a sensor 120. Lens 110 may be any lens, which may be a fixed lens or changeable lens. Sensor 120 may be any sensor that is capable of detecting or receiving a signal (e.g., an infrared signal) that indicates a restriction in capturing an image and/or a video. Camera 100 includes other components (not shown), such as a flash light, control buttons, other sensors, and/or display terminal. Camera 100 can be any device, such as a smartphone, a computer, etc. that includes at least one lens 110. Further, the camera may be of any size and may be mountable on a stationary or moving object. For example, an object carried or worn by a person, or article of clothing/accessory may include. Alternatively, the camera may be positioned on one's body itself.

Figure 1B:
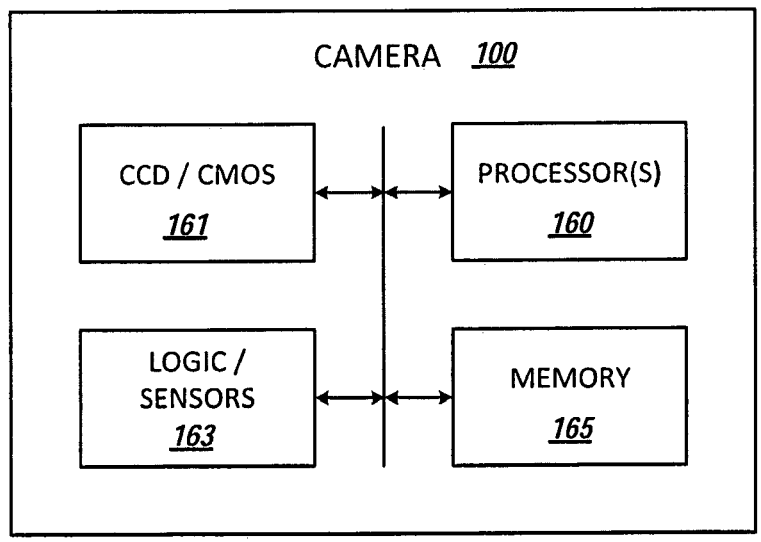
FIG. 1B shows example processing components of a camera.

FIG. 1B shows example processing components of a camera. Camera 100 may be a digital camera (e.g., not capturing images on film) that includes at least one charge-coupled device (CCD) and/or complementary metal-oxide semiconductor (CMOS) 161 for capturing images. Camera 100 includes logic circuitry and sensors 163, which may include sensor 120 and a microphone (not shown); one or more processors 160 (e.g., for processing images captured by CCD/CMOS 161); and memory 165 (e.g., for storing the captured and/or processed images). Another example of a camera is described in FIG. 5 below.

Figure 2:
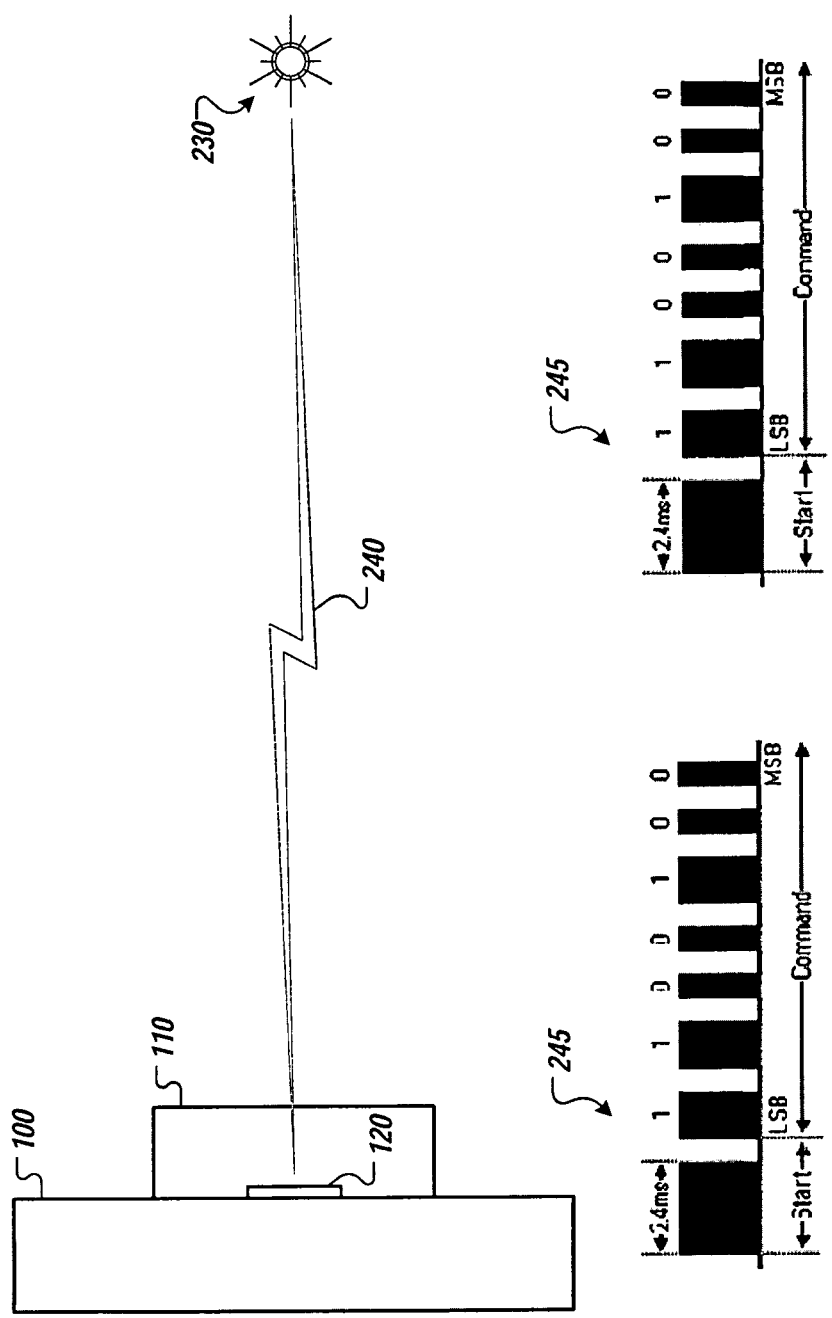
FIG. 2 shows an example environment where a camera may encounter recording restrictions.

FIG. 2 shows an example environment where a camera may encounter recording restrictions. Example cameras are described herein with the capabilities to honor or respect recording restrictions (e.g., camera 100). For example, to ensure that cameras do not capture an image or record a video of a private object, private view, or private person (e.g., a person in a dressing room or a private room), a recording restriction signaling source (e.g., signal transmitter 230) may be positioned nearby.

When camera 100 is positioned with its lens 110 towards signal transmitter 230, the signals or light emitted from signal transmitter 230 are received or detected by camera 100 (e.g., by sensor 120) to indicate that there are recording restrictions in front of camera 100.

In some implementation, signal transmitter 230 may be a source that transmits infrared (IR) light (referred to as a light source 230). Light source 230 emits light that is invisible to human eyes but can be detected or received by sensor 120. Some cameras may detect the IR light through lens 110 using a CCD or CMOS. Other alternative sensors may be substituted therefor, without departing from the inventive scope.

Light source 230 may transmit signals or pulses in unique patterns 245 that identify different restrictions, such as a restriction to capture an image or video (recording prohibition) or a restriction to capture a region (e.g., a face of a person) in the vicinity of light source 230 (privacy restriction). As used herein, the term "region" may encompass a point, an area or volume, or other location, in any number of dimensions as would be understood in the art, without departing from the scope of the example implementations.

Recording prohibition or "Do Not Record" signals may be encountered in venues such as theaters, concert halls, churches, court rooms, etc. to protect the privacy people or copyright of performances. At these venues, one or more light sources or recording restriction signal emitters may be placed nearby. For example, positioning the signal emitters near the screen of a theater or stage of a dance hall to meet the front of cameras facing the screen or stage.

Do Not Record signals prohibit recording of images and/or videos. Do Not Record signals do not carry special data and can be detected or received by a signal receiver (e.g., for infrared signals, an IR receiver or sensor). IR transmitters and receivers are commonly available and used in many consumer IR devices, such as a television remote control (an IR transmitter) and remote control sensor at a television (an IR receiver or sensor). Some cameras today may have integrated with IR sensor, such as cameras with remote controls.

IR signal detecting and sampling can be performed quickly, in microseconds to milliseconds. For example, an IR protocol may be implemented that sends a binary "1" in 1.8 milliseconds (ms) and a binary "0" in 1.2 ms. Sending and receiving a seven-bit signal or command (e.g., unique signal pattern 245) using the IR protocol would take between 10 to 15.6 ms, including 3 ms for the header (e.g., 2 bit 2.4 ms of light followed by a 0.6 ms space interval to indicate the start of the message).

The Do Not Record signals can be implemented using fewer numbers of bits if less data is to be communicated. For example, a 3 ms header (as above and in unique signal pattern 245);
1 bit indicating whether the camera may record image/video ('1' for yes, '0' for no); and
1 bit indicating whether the camera may record audio ('1' for yes, '0' for no).

In some implementations, the Do Not Record signals can include a 64-bit date and time when this signal/message was created (in milliseconds since 00:00 hours, Jan. 1, 1970 UTC). A timestamp is used so that this signal cannot be replicated and/or improperly used elsewhere. A 68-bit signal can be communicated between 82-122 ms.

In some implementations, the Do Not Record signals or the timestamp can be encrypted using public key cryptography so that the sender, transmitter, or venue can be authenticated. An example key may be a 768 bit public key, which is considered "safe" to use in a RSA algorithm for public-key cryptography. The public key is sent with the Do Not Record signals. An 836-bit signal can be communicated in just over one second (e.g., about 1.25 seconds). Encrypting the Do Not Record signals with a public key signed by a certificate authority may help prevent unauthorized parties from falsely erecting Do Not Record signals.

The receiving camera verifies the authenticity of the public key with a certificate authority. For example, the camera may have access to a network (e.g., a camera with a smartphone with access to a wireless network) and uses the network to communicate with a certificate authority. After a successful verification, the public key is then used by the receiving camera to decrypt the timestamp for validation. For example, the timestamp may be compared to the current time. If the result is greater than some threshold (e.g., 10 seconds), then the entire Do Not Record signal is ignored. Otherwise, the two bits that indicate whether the image/video and audio can be recorded are implemented (e.g., honored) by the camera.

If a recording prohibition or Do Not Record signal is received and/or verified, the camera may disable the recording or capturing function, such as disabling or preventing light to reach a CCD/CMOS and/or disabling storage of the CCD/CMOS contents to the memory of the camera. If sound recording is prohibited, disables the capturing and/or storing in memory of sound data received by the camera's microphone.

In some implementations, a camera may start recording as usual while receiving and verifying a Do Not Record signal. Once a Do Not Record signal is verified, the camera may stop recording and/or discard (e.g., delete) everything that the camera had already recorded and stored in the memory.

Figure 3A:
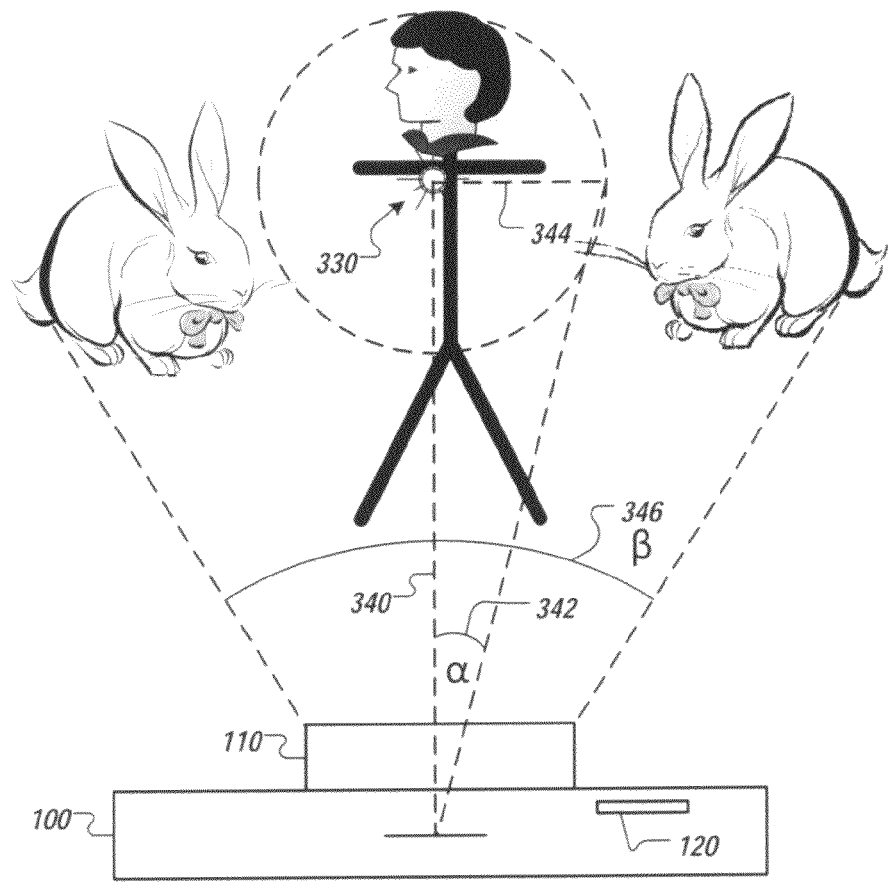
FIG. 3A shows example operations of a camera encountering recording restrictions.

FIG. 3A shows example operations of a camera encountering recording restrictions. Light source 330 may emit privacy restriction signals that prohibit or restrict recording or capturing one or more regions in the vicinity of the light source. For example, light source 330 may restrict recording or capturing one or more human's faces, a region X square meters with the light source being the center, a region Y meters radius centered at the light source, etc.

Privacy restriction signals or "Area off Limit" signals transmit spatial data (e.g., defining the off limit regions). Privacy restriction signals may be received by sensor 120 or lens 110. Once a privacy restriction signal is detected, lens 110 will focus on the signal (e.g., invisible IR light) the same way the lens focuses on the visible light.

A video can be recorded 30 frames per second (fps). For receiving data (e.g., special data) transmitted in a privacy restriction signal, a processor of a camera can process 30 fps or at a much higher rate. For example, the processor just needs to image process to detect a binary bit of "1" or "0" and save that detected bit. The processor can be programmed to but does not need to process the content of an entire frame and does not save the content of the frame. If the sample rate for receiving IR signals as described above is equal to the frame rate of 30 fps, a signal of six bits, at one bit per frame, can be detected in about 0.2 second. Six bits because:

a 2-bit at 33.33 ms/bit of light followed by a 16.66 ms space interval to indicate the start of the message; and
a 4-bit number at 33.33 ms/bit to indicate a radius in feet (4 bits yields a range of 0-15 feet).

In many situations, such as a person carrying a privacy light source 330, no authentication or encryption is necessary. Thus, a privacy restriction signal can be received in a fraction of a second. Cameras can be programmed to respect this type of restriction signal even if an image or a portion (e.g., six frames) of a video have been captured or recorded. The camera can be programmed to process the capture or recorded contents according to the data received in the signal (e.g., retrieve the contents from memory if already stored there, process the contents, and store the process contents in the memory).

The restricted regions may be processed in any manner that prevents the regions from showing as captured. For example, contents (e.g., pixel data) of the restricted regions may be blurred or replaced with other (e.g., random or scrambled) pixel data. Processing may be performed using facial detection techniques and/or other techniques (e.g., blurring just the faces of the regions).

In FIG. 3A, for example, a person who desires his or her face not show up in some random images and videos may carry a privacy light source 330 in the form factor of a watch, bracelet, necklace, earrings, a pin, or any clothing accessory that is readily visible. The privacy light tells cameras in the vicinity to blur or obfuscate everything within a region or circle a specific radius 344 from the light. This distance may be specified in world-space, and the camera is responsible for calculating how much of the corresponding image region to be blurred. The camera software can calculate the corresponding image region by roughly calculating the distance 340 from the camera to the light source using, for example, the apparent brightness of the light source as the primary measure of distance, and combining distance with the known field of view 346 of the camera (e.g., from zooming data of the lens) to determine the total region of the image that needs to be blurred. Other criteria for calculation or estimation may also be substituted therefor, as would be understood in the art.

For example, the region to blur or obfuscate on the resulting image can be calculated trigonometrically as follows:

Luminosity of light source 330=10 Watts (assuming this is a standard for all privacy lights)
Camera field of view 346β=60 degrees (provided by camera 100's zooming data from lens 110)
Image width=1280 pixels (the width at which images are being captured)
Blur radius 344=1 foot (sent as part of the signals)
Perceived brightness=0.01 Watts/ft^2 (calculated by the camera 100, indicating how much IR light is received over a specific amount of region)
Distance from camera 340=Sqrt (Luminosity/(4 pi*Perceived brightness))=8.9 ft
Angle of blur radius 342α=arctan (Blur radius/Distance from camera)=0.112 radians=6.4 degrees
Screen space blur radius=Image width*(Angle of blur radius α/Camera field of view β)=136 pixels Thus, a circle with a radius of 136 pixels which is centered on the light source 330 in the image should be blurred or obfuscated.

Figure 3B:
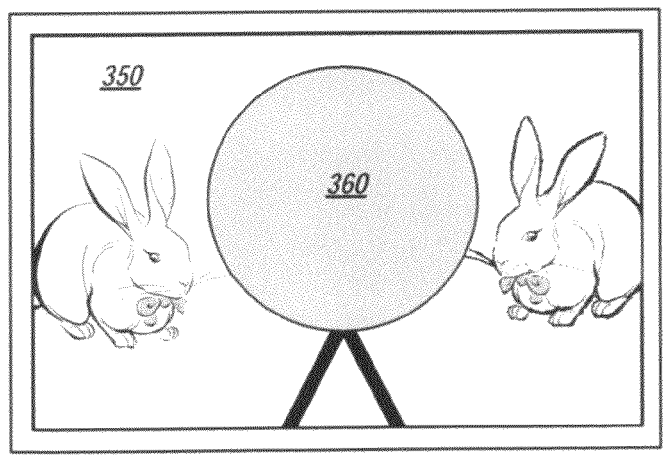
FIG. 3B shows an example outcome produced by a camera.

FIG. 3B shows an example outcome produced by a camera. Image 350 is captured with region or circle 360 obfuscated (in this case, by replacing the pixel contents in the region). Image 350 may be an image of a still photo or an image of a frame of a video with the images in other frames process similarly with a corresponding region or circle obfuscated.

Figure 4:
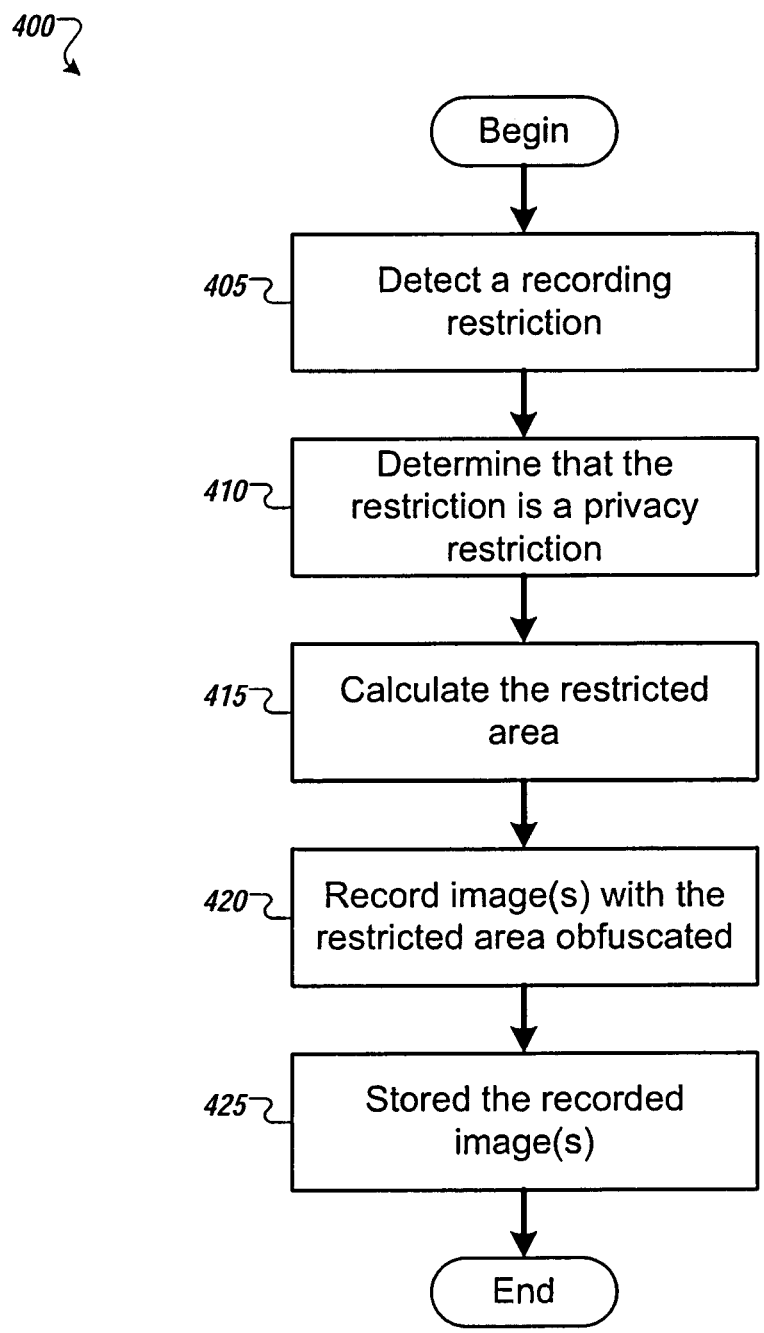
FIG. 4 shows an example of a process implementation.

FIG. 4 shows an example of a process implementation. For example, the process may be implemented in a camera or a device with camera function to honor recording restriction signals. At block 405, a recording restriction signal is detected, which can be a recording prohibition or a privacy restriction. At block 410, the signal is determined to be a privacy restriction signal, which may include special data such as the size of one or more restricted regions. At block 415, the restricted region(s) are calculated, for example, in image resolution terms expressed in pixels. At 420, an image or series of images or frames of a video are recorded and processed (e.g., with the restricted region blurred or otherwise obfuscated). The processed contents are stored in memory at block 425.

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
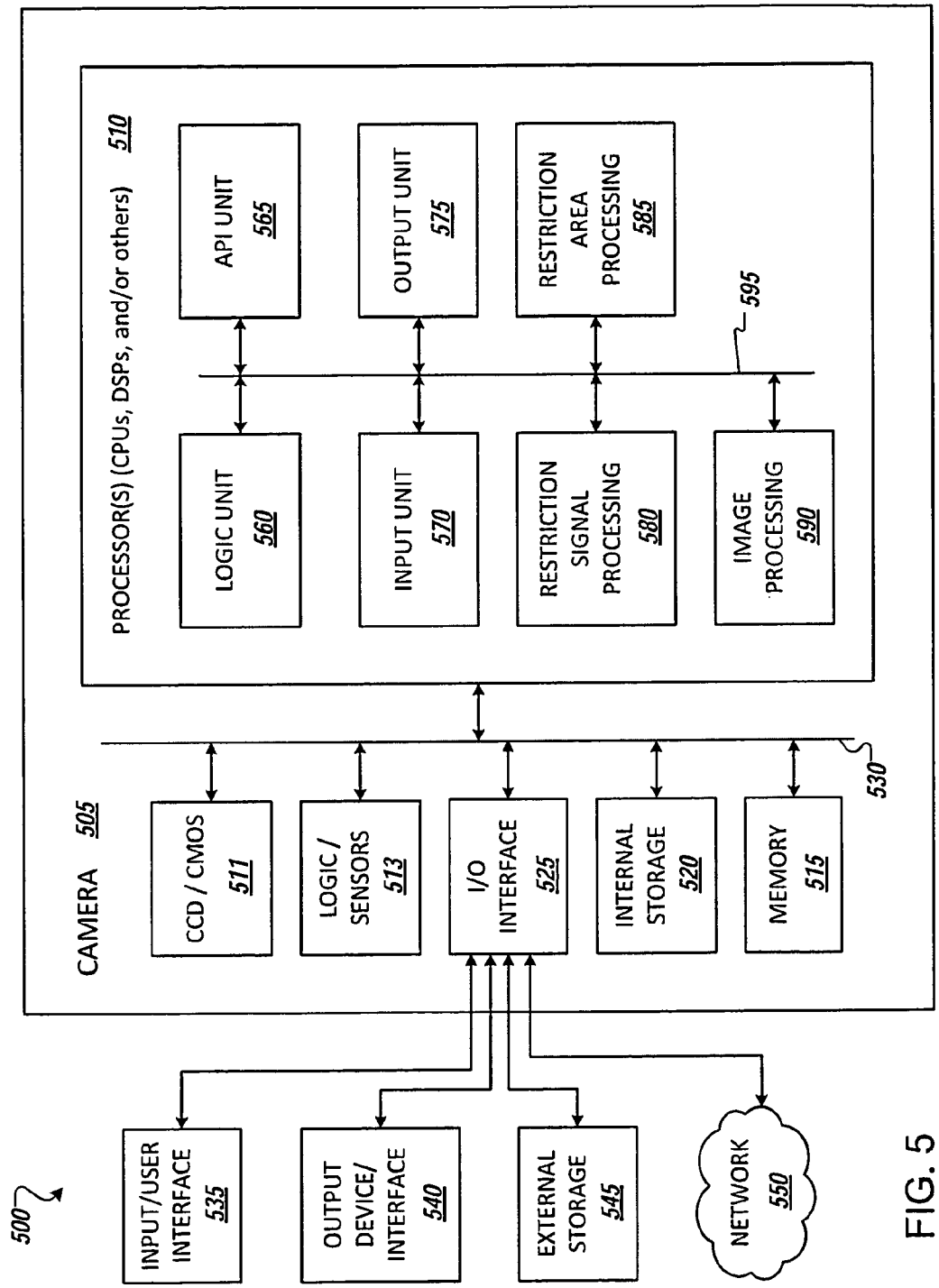
FIG. 5 shows an example computing environment with an example camera suitable for use in some example implementations.

FIG. 5 shows an example computing environment with an example camera suitable for use in some example implementations. Camera 505 (e.g., a digital camera) may include a charge-coupled device (CCD) and/or complementary metal-oxide semiconductor (CMOS) 511 or the like for detecting light or an image; include logic circuitry and sensors 513 (e.g., infrared sensors); and include structures for performing computing functions in computing environment 500. Camera 505 can include one or more processing units, cores, or processors 510 (e.g., CPUs, DSPs, etc.), memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in Camera 505, which can be referred to as a computing device.

Computing device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some example implementations, input/user interface 535 and output device/interface 540 can be embedded with or physically coupled to the computing device 505. In other example implementations, other computing devices may function as or provide the functions of input/user interface 535 and output device/interface 540 for a computing device 505.

Examples of computing device 505 may be any device with at least one camera, including, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 505 can be communicatively coupled (e.g., via I/O interface 525) to external storage 545 and network 550 for communicating with any number of networked components, devices, and systems, including one or more computing devices of the same or different configuration. Computing device 505 or any connected computing device can be functioning as, providing services of, or referred to as a server, client, thin server, general machine, special-purpose machine, or another label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, restriction signal processing 580, restriction region processing 585, image processing 590, and inter-unit communication mechanism 595 for the different units to communicate with each other, with the OS, and with other applications (not shown). For example, restriction signal processing 580, restriction region processing 585, and image processing 590 may implement one or more processes described and/or shown in FIGS. 2-4. The described units and elements can be varied in design, function, configuration, or implementation and are not limited to the descriptions provided.

In some example implementations, when information or an execution instruction is received by API unit 565, it may be communicated to one or more other units (e.g., logic unit 560, input unit 570, output unit 575, restriction signal processing 580, restriction region processing 585, and image processing 590). For example, a CCD or CMOS 511 or an infrared sensor 513 may detect a recording restriction signal and passes it to restriction signal processing 580, which determines that the signal is a privacy restriction signal (e.g., restricts recording of a region in camera 505's view). restriction region processing 585 then determines the restricted region or regions in relation to the view through the lens of camera 505. Every time camera 505 changes the zooming, restriction region processing 585 may recalculate the restricted region(s). The image processing 590 then processes an image or a series of images (e.g., frames of a video) based on the restricted regions, such as blurring the region(s) or changes pixels in the region(s) of the image or video.

In some instances, logic unit 560 may be configured to control the information flow among the units and direct the services provided by API unit 565, input unit 570, output unit 575, restriction signal processing 580, restriction region processing 585, and image processing 590 in some example implementations described above. For example, the flow of one or more processes or implementations may be controlled by logic unit 560 alone or in conjunction with API unit 565.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A camera-implemented method for image processing, comprising:
    detecting a recording restriction signal received from an external source that is positioned at an object to be recorded by a camera;
    determining that the recording restriction signal is a privacy restriction that comprises an instruction for the camera to disable recording of at least some content associated with the object at the external source;
    calculating a restricted region that includes spatial data of the region associated with the instruction to disable recording, based on the privacy restriction;
    disabling the camera from recording the restricted region of the at least some content associated with the object at the external source;
    recording one or more images, at least one of the images not including the calculated restricted region such that the at least some content of the calculated restricted region is not recorded; and
    storing the at least one of the recorded images,
    wherein the recording restriction signal comprises a header, and at least a bit indicative of at least one of whether the camera may record the one or more images and whether the camera may record audio.

2. The method of claim 1, wherein the external source is an infrared signal source.

3. The method of claim 1, wherein the restricted region is based on a location of the external source, the location corresponding to a location of the restricted region.

4. The method of claim 1, wherein the restricted region is based on a distance from a camera implementing the method to the external source.

5. The method of claim 1, further comprising:
    changing a position of the external source that is positioned at the object to be recorded; and
    recalculating the restricted region based on the changed position of the external source for another one of the one or more images.

6. The method of claim 1, further comprising:
    recalculating the restricted region based on a change in zooming data for another one of the one or more images.

7. The method of claim 1, wherein the spatial data is calculated trigonometrically based on a luminosity of the external source, a field of view of the camera, a width of the image, a prescribed blur radius, a perceived brightness calculated by the camera, a distance of the external source from the camera, an angle of the prescribed blur radius, and a screen space blur radius, to generate a radius of pixels to define the calculated restricted region.

8. The method of claim 1, wherein the recording restriction signal comprises six bits, including a 2-bit number at 33.33 ms/bit followed by a 16.66 ms space internal indicative of a start of a message; and a 4-bit number at 33.33 ms/bit indicative of a radius of the restricted region.

9. The method of claim 1, wherein the detected recording restriction signal is formatted, and the camera performs a verification of the encrypted recording restriction signal, and performs a decryption prior to the determining.

10. A non-transitory computer readable medium having stored therein computer executable instructions for:
- detecting a recording restriction signal received from an external source that is positioned at an object to be recorded by a camera;
- determining that the recording restriction signal is a privacy restriction that comprises an instruction for the camera to disable recording of at least some content associated with the object at the external source;
- calculating a restricted region that includes spatial data of the region associated with the instruction to disable recording, based on the privacy restriction;
- disabling the camera from recording the restricted region of the at least some content associated with the object at the external source;
- recording one or more images, at least one of the images not including the calculated restricted region such that the at least some content of the calculated restricted region is not recorded; and
- storing the at least one of the recorded images,
- wherein the recording restriction signal comprises a header, and at least a bit indicative of at least one of whether the camera may record the one or more images and whether the camera may record audio.

11. The computer readable medium of claim 10, wherein the external source is an infrared signal source.

12. The computer readable medium of claim 10, wherein the restricted region is based on a location of the external source, the location corresponding to a location of the restricted region.

13. The computer readable medium of claim 10, wherein the restricted region Is based on a distance from a camera implementing the method to the external source.

14. The computer readable medium of claim 10, further comprising:
- changing a position of the external source that is positioned at the object to be recorded; and
- recalculating the restricted region based on the changed position of the external source for another one of the one or more images.

15. The computer readable medium of claim 10, further comprising:
- recalculating the restricted region based on a change in zooming data for another one of the one or more images.

16. The computer readable medium of claim 10, wherein the spatial data is calculated trigonometrically based on a luminosity of the external source, a field of view of the camera, a width of the image, a prescribed blur radius, a perceived brightness calculated by the camera, a distance of the external source from the camera, an angle of the prescribed blur radius, and a screen space blur radius, to generate a radius of pixels to define the calculated restricted region.

17. The computer readable medium of claim 16, wherein the recording restriction signal comprises six bits, including a 2-bit number at 33.33 ms/bit followed by a 16.66 ms space internal indicative of a start of a message; and a 4-bit number at 33.33 ms/bit indicative of a radius of the restricted region.

18. The computer readable medium of claim 10, wherein the detected recording restriction signal is formatted, and the camera performs a verification of the encrypted recording restriction signal, and performs a decryption prior to the determining.

* * * * *